United States Patent
Peterman

(10) Patent No.: US 6,480,838 B1
(45) Date of Patent: Nov. 12, 2002

(54) SYSTEM AND METHOD FOR SEARCHING ELECTRONIC DOCUMENTS CREATED WITH OPTICAL CHARACTER RECOGNITION

(76) Inventor: William Peterman, 4444 Mississippi St., San Diego, CA (US) 92103

( * ) Notice: Subject to any disclaimer, the term of this patent is extended or adjusted under 35 U.S.C. 154(b) by 22 days.

(21) Appl. No.: 09/590,875

(22) Filed: Jun. 9, 2000

Related U.S. Application Data

(63) Continuation of application No. 09/053,846, filed on Apr. 1, 1998, now abandoned.

(51) Int. Cl.[7] .............................................. G06F 17/30
(52) U.S. Cl. ....................... 707/3; 707/2; 707/4; 707/5; 707/533; 707/534
(58) Field of Search ........................... 707/5, 533, 534, 707/2, 3, 4

(56) References Cited

U.S. PATENT DOCUMENTS

| | | | |
|---|---|---|---|
| 3,688,266 A | * 8/1972 | Watanabe et al. | 340/146.3 |
| 3,969,698 A | * 7/1976 | Bollinger et al. | 340/146.3 |
| 4,654,875 A | 3/1987 | Srihari et al. | |
| 4,977,602 A | * 12/1990 | Beato | 382/27 |
| 4,985,863 A | * 1/1991 | Fujisawa et al. | 364/900 |
| 5,418,864 A | * 5/1995 | Murdock et al. | 382/309 |
| 5,461,488 A | 10/1995 | Witek | |
| 5,465,309 A | 11/1995 | Johnson | |
| 5,600,835 A | * 2/1997 | Garland et al. | 707/5 |
| 5,606,690 A | * 2/1997 | Hunter et al. | 707/5 |
| 5,625,719 A | * 4/1997 | Fast et al. | 382/275 |
| 5,625,721 A | * 4/1997 | Lopresti et al. | 382/309 |
| 5,802,515 A | * 9/1998 | Adar et al. | 707/5 |
| 5,875,263 A | * 2/1999 | Froessl | 382/181 |

* cited by examiner

*Primary Examiner*—Frantz Coby
(74) *Attorney, Agent, or Firm*—Christensen O'Connor Johnson Kindness PLLC

(57) ABSTRACT

A method, system and computer product for processing search requests in order to compensate for characters and character strings misread during OCR scanning is disclosed. After an alphanumeric search request is entered, the system determines variant words associated with the entered alphanumeric search request according to a predefined table of possible OCR errors, the OCR errors' probability of occurrence and a predefined threshold of probability of occurrences. When the preprocessing is complete, a search engine then uses the variant words to search a database containing OCR scanned documents.

21 Claims, 5 Drawing Sheets

SYSTEM AND METHOD FOR SEARCHING ELECTRONIC DOCUMENTS CREATED WITH OPTICAL CHARACTER RECOGNITION

RELATED APPLICATION

This application is a continuation application of U.S. application Ser. No. 09/053,846, filed Apr. 1, 1998, now abandoned the disclosure of which is hereby incorporated by reference.

FIELD OF THE INVENTION

This invention relates to methods, apparatus and computer products for computer database searching and, more particularly, methods, apparatus and computer products for searching documents created using optical character recognition techniques.

BACKGROUND OF THE INVENTION

Much of the information upon which business and government rely is, and has been, stored on paper. With the advent of readily accessible wide area networks, high-speed optical scanners, and cheap mass storage, there has been an attempt in recent years to make paper information machine-accessible.

Machine-accessible information has many advantages over paper. Electronic data storage is far less expensive than filing cabinets in storage rooms, especially once rent is considered. Retrieval times are measured in seconds or tenths of seconds rather than minutes, hours, or even days, particularly for information in large archives. Information replication is trivial, and multiple people can access a single document simultaneously. Unfortunately, the task of converting the mass of existing paper information into machine-accessible form is daunting.

One method scans each document using an optical scanner and automatically processes each document as it is scanned. An optical scanner creates an electronic image of a document. Optical character recognition (OCR) software processes the electronic image and creates an electronic text file representing the document. "Indexing" software reads each text file and creates an index for all of the documents. A search program can then use the index to locate documents that contain a specified word, or combination of words. The process of indexing and searching documents is referred to as full-text indexing and retrieval.

Full-text indexing and retrieval has two powerful assets: it is fully automatic (and thus relatively inexpensive), and is based directly upon the actual contents of the document scanned. High-end retrieval systems may include context sensitivity, which permits the location of documents that contain related words, in situations where a user specifies the subject of a document but not its exact phrasing. World Wide Web search engines use full-text retrieval engines to search millions of electronic documents.

Search engines sometimes fail to locate documents that have been created using scanners and OCR software. This is due to the existence of numerous errors in large databases made up of scanned documents. A large database may include more than a million documents and ten million pages. To search for a document, a user must specify a combination of words, perhaps three or more, that either make a document unique, or at least restrict the list of search results to a manageable size. If a potential target document includes errors in the keywords used for the search, the search engine will not locate the document. OCR programs often produce several errors per page. An example of such an error would be a letter, e.g., an upper case "I", misrepresented as a similar letter, e.g. a lower case "l" (el).

One solution to the problem is a "fuzzy search." Fuzzy searching is based on the concept that words containing errors are structurally similar to the true version of the word. For example, "internet" and "intemet" are structurally similar. The first word can be changed into the second by deleting one letter and substituting an "m" for the other. Fuzzy search routines count the changes necessary to change one word into another. If few enough changes are required, a match is reported. This is computationally expensive because, during a search, every unique word in the database is individually compared to the key word to determine whether there is a match. Because OCR errors frequently produce "unique words," the database containing the full-text index of a large archive can have more than a million unique words to compare to each key word. Even on a fast server, such a search takes time.

In addition to the amount of time it takes, fuzzy searching can result in a large volume of "hits." In a large database, many searches return thousands of matches. "Internet" is similar to "intemet," but so is "intem," "undernet", and even "international". A search for "boat" might match "coat," even though an OCR program is very unlikely to confuse a "b" for a "c."

It is desirable to have a mechanism that allows a search engine to accurately locate electronic documents that have been created using OCR software. Preferably, such a mechanism will recognize errors that are typically produced by OCR software and account for errors having the highest probability of occurrence. Additionally, a preferable mechanism will minimize the amount of processing that occurs when a search is requested by a user, in order to reduce the time of each search.

SUMMARY OF THE INVENTION

In accordance with this invention, a method and computer product for processing a search request in order to compensate for characters and character strings improperly interpreted during optical character recognition (OCR) scanning is provided. After an alphanumeric search request is received, the mechanism of the invention determines variant words associated with the received alphanumeric search request according to a predefined table of possible OCR substitutions, the OCR substitutions' probability of occurrence, and a predefined threshold of probability of occurrences. A database with OCR scanned documents is then searched for the variant words.

In accordance with other aspects of the invention, variant words are determined by determining word segments that represent OCR interpretations of portions of the search request. A cumulative probability for each word segment is determined and, if the cumulative probability for a word segment is below a predetermined threshold, the word segment is rejected as a variant word.

In accordance with further aspects of the invention, a tree data structure is created, having branch nodes and substitution nodes. Each branch node represents a possible delineation of a character during OCR processing. Each substitution node represents a possible OCR substitution for the character corresponding to the parent branch node. The substitution nodes along a path from the root to a leaf node form a variant word. The cumulative probability for a substitution node is determined by multiplying the probability of occurrence for the node by the cumulative probability of occurrence for the node's grandparent substitution node.

As will be readily appreciated from the foregoing summary, the invention provides a new and improved method, apparatus and computer product for word searching of electronic documents produced using optical character recognition. The invention reduces the number of documents that are missed during a search due to OCR errors when the documents are originally translated into electronic form. The invention also reduces the amount of time required to perform a search by minimizing the amount of processing that is performed after the search request is received. Finally, because the variant words constructed in this manner are rarely legitimate words in the natural language of the database, the number of false "hits" is greatly reduced.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
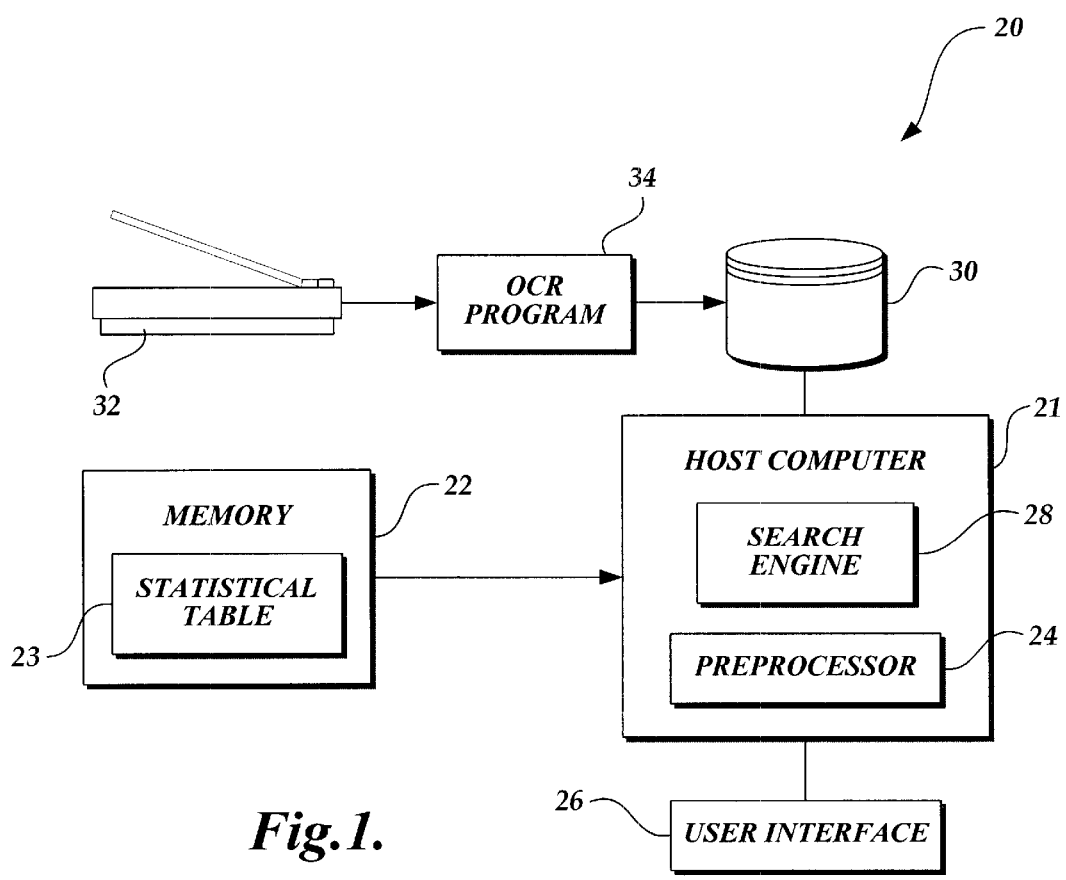
FIG. 1 illustrates some basic components of a computer system suitable for embodying the present invention.

FIG. 1 illustrates the components of a text searching system 20 formed in accordance with the invention. More specifically, the text searching system 20 includes a memory 22 with a prestored statistical table 23, a pre-processor 24 coupled to the memory 22, a user interface device 26 for inputting search requests to the pre-processor 24, a search engine 28 for receiving search requests from pre-processor 24 and a database 30 that includes prestored documents that are searched by search engine 28. The system 20 may also include a scanner 32, which optically scans documents, and an optical character recognition (OCR) program 34, which processes images produced by the scanner 32 to produce text files for insertion into the database 30. Interface device 26 includes user input devices such as a keyboard and a mouse and an output device such as a display device or a printer. In this example, the pre-processor 24 and search engine 28 are located within a host computer 21. However, as can be readily appreciated by those of ordinary skill in the art, the pre-processor 24 and search engine 28 may be remote from one another. For example, pre-processor 24 may be located on a client's host computer and the search engine 28 may be located at a server's computer system which is connected to the pre-processor 24 over a public or private data network. In another alternate configuration, the user interface device 26 may be connected to a client computer that communicates with the host computer 21 over a computer network, such as a wide area network or a local area network. Additionally, the database 30 may reside on the host computer 21 or on a separate computer that communicates with the host computer 21 either directly or over a computer network.

Figure 2:
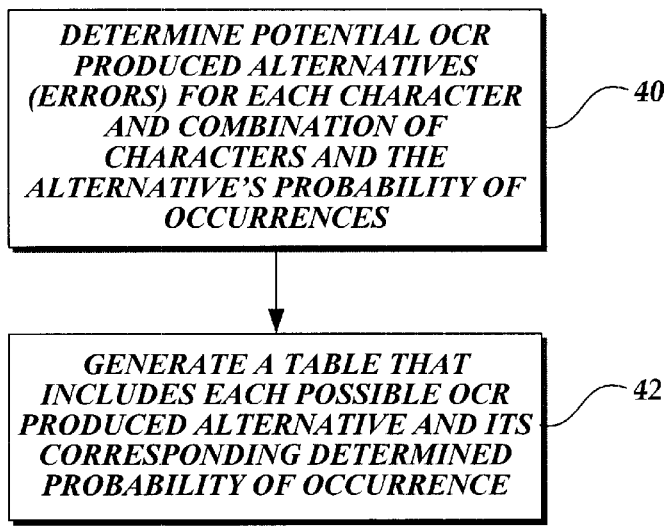
FIG. 2 is a flow diagram illustrating a process for generating an optical character recognition (OCR) statistical table used for enabling the present invention.

Prior to proper operation of the searching system 20, the statistical table 23 is generated. As shown in FIG. 2, at block 40, potential OCR-produced alternatives (errors) for each character and character string and each alternative's probability of occurrence are determined. Generating a list of possible alternatives and their probability of occurrence can be performed experimentally in several ways. For example, a number of documents generated by a word processing system are printed. The printed documents are then scanned by a scanner 32 and processed by an OCR program 34. The OCR scanned documents are then compared to the original word processing created documents. The differences and their probability of occurrence are determined. The OCR techniques used to generate the statistical table are preferably similar to the OCR techniques used to enter the documents into the database.

Figure 3:
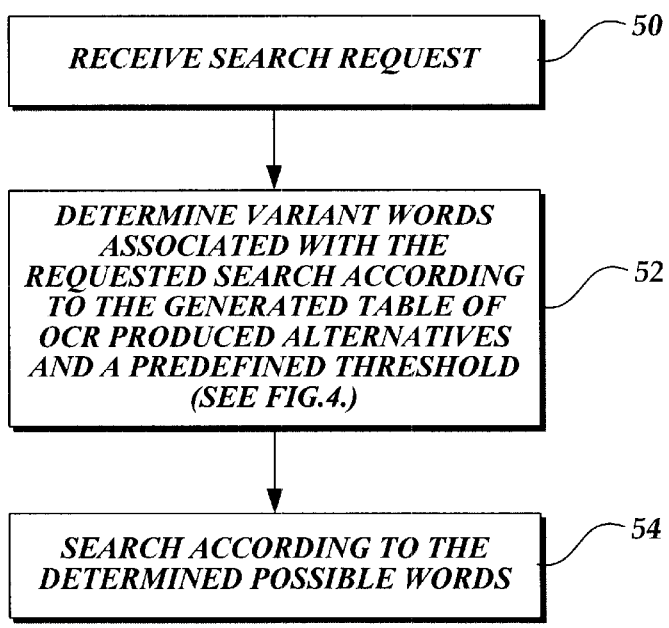
FIGS. 3 and 4 are flow diagrams illustrating a process for searching a database of OCR scanned documents, in accordance with the present invention.
Figure 4:
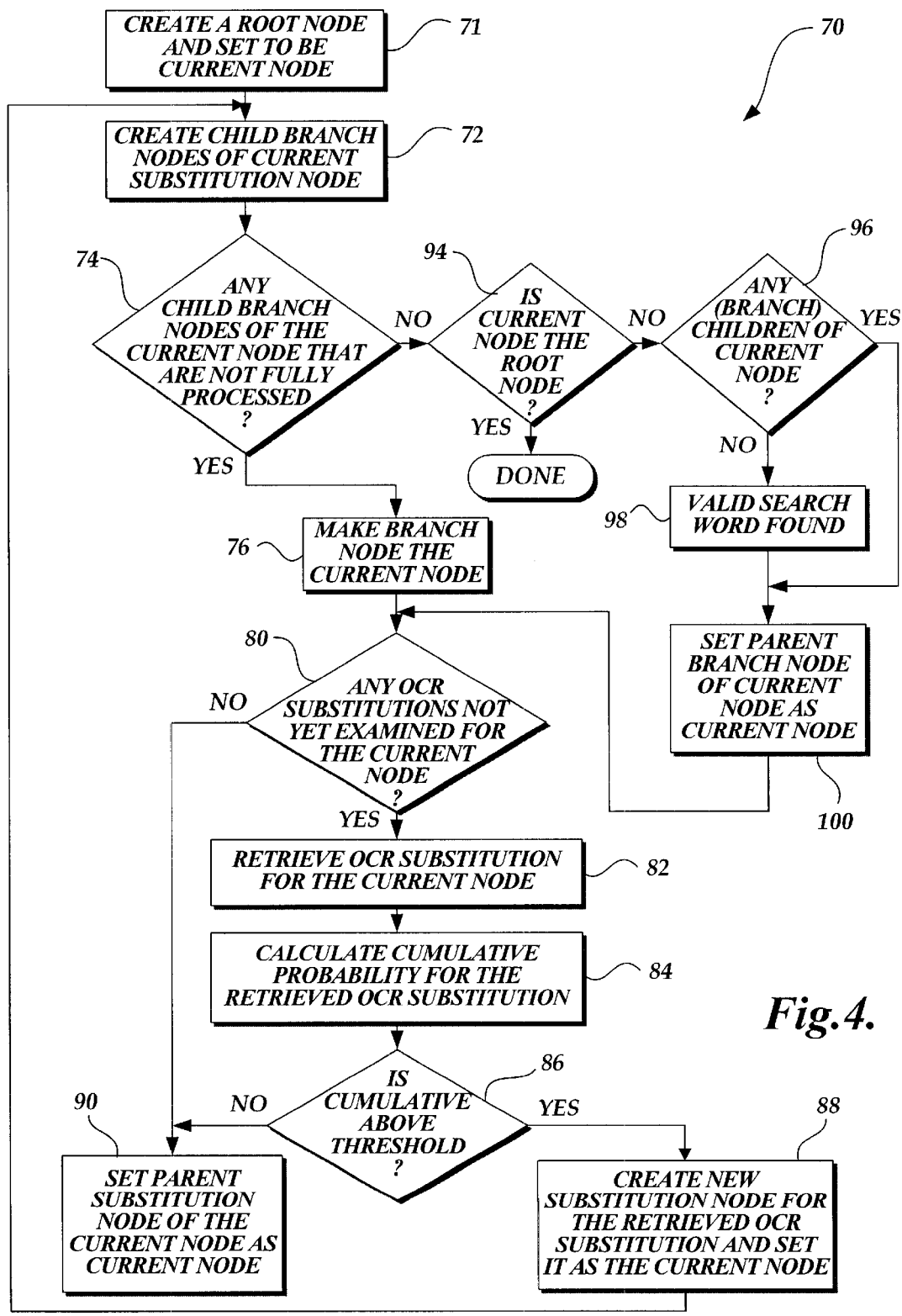
Figure 6:
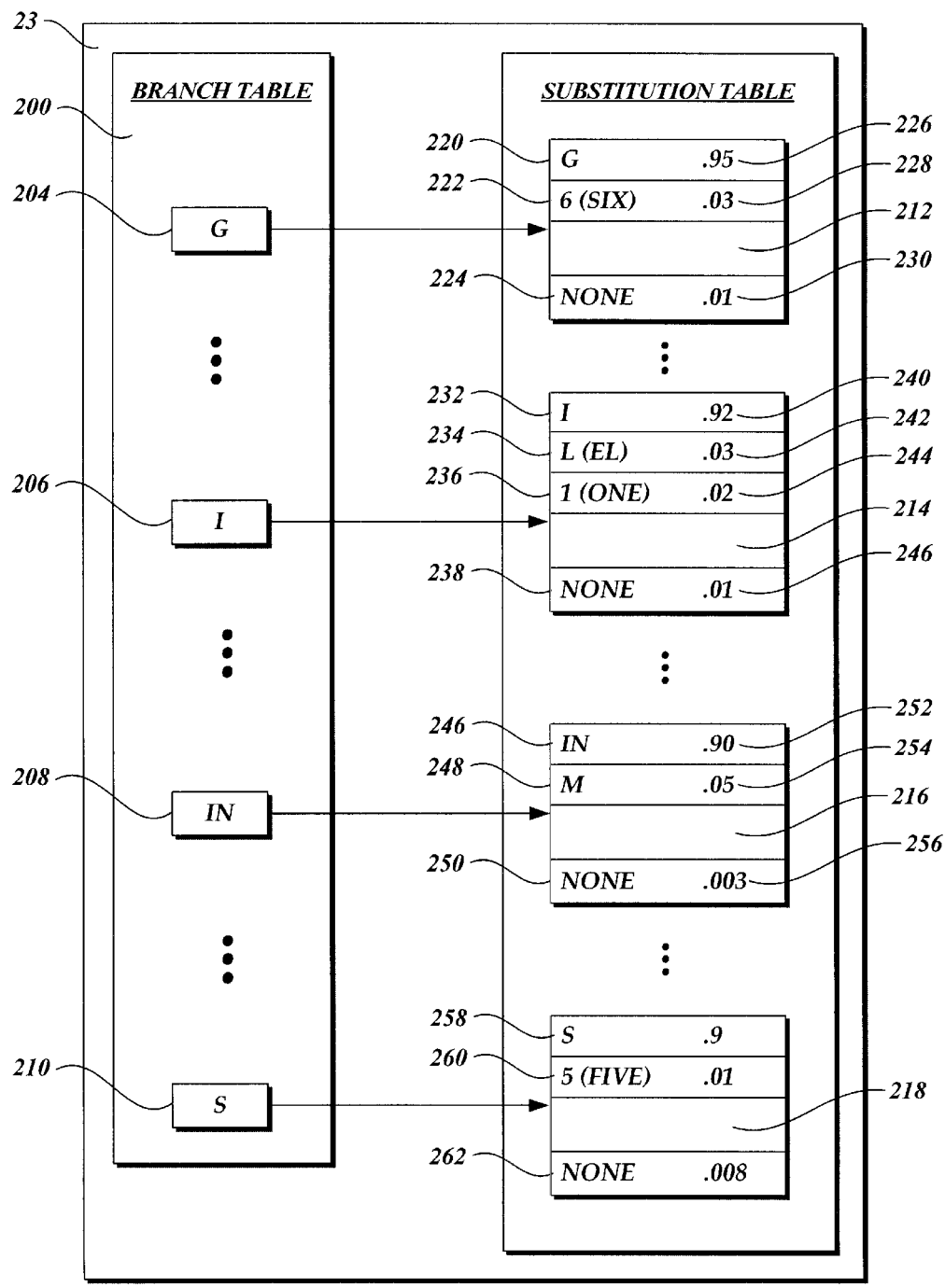
FIG. 6 is a relationship diagram illustrating the relationship of information from the example search of FIG. 5 stored in the statistical table created as shown in FIG. 2.

At block 42, a table is generated that includes all characters and combinations of characters that have been determined to produce an alternative, together with the corresponding probabilities of occurrence. A preferred statistical table 23 is illustrated in FIG. 6 and discussed in further detail below. After the statistical table 23 is generated, searching system 20 is ready to perform efficient searches of a database 30 that includes documents entered into the database using OCR techniques. As illustrated in FIG. 3, at block 50, a search request is received by the pre-processor 24. Preferably, the search request is entered by a user interacting with the user interface device 26, and then is passed to the pre-processor 24. Next, at block 52, the pre-processor 24 determines variant search words associated with the requested search according to the statistical table and a predetermined probability of occurrence threshold. This determination process is illustrated in FIG. 4 and described in more detail below. Finally, at block 54, the search engine 28 searches the database 30 according to the determined variant search words. The results of the search are then sent to the user interface device 26 for user viewing.

FIG. 4 illustrates the process 70 of determining variant substitution words associated with a requested search. The process 70 builds a set of nodes that are linked in a tree structure. Prior to discussing the process 70 of determining variant substitution words, an explanation of the statistical table 23 (FIG. 1) is provided. FIG. 6 illustrates an exemplary statistical table 23, which includes data pertaining to the statistical probability of specific errors during OCR processing.

As depicted in FIG. 6, in one actual embodiment of the invention a statistical table 23 includes a branch table 200 and a substitution table 202. The branch table 200 contains a set of entries 204, 206, 208, and 210, each entry representing a character or character combination. These entries represent characters and character combinations that may make up an electronic image being processed by an OCR program 34 (FIG. 1). In particular, the branch table entries represent characters or character combinations that the OCR program 34 may perceive to be a single character during OCR processing. FIG. 6 depicts only a small number of these entries, in order to illustrate the process 70 (FIG. 4) of determining variant substitution words. An actual statistical table 23 includes many more entries and, in particular, at least one entry corresponding to every letter of the alphabet.

Preferably, the entries 204, 206, 208, 210 in the branch table are organized in a structure that permits fast look-up, such as a hash table. Hash tables are well known to those skilled in the art of computer programming, and are discussed herein only as necessary to describe the invention.

Each branch table entry 204, 206, 208, 210 has a pointer to a corresponding substitution table entry 212, 214, 216, 218 in the substitution table 202. A substitution table entry 212, 214, 216, 218 contains a set of OCR variant entries representing a possible OCR interpretation of the character combination represented by the corresponding branch table entry. For example, as depicted in FIG. 6, the branch table entry 204 represents the single letter "G". The "G" branch table entry 204 corresponds to, and points to, the substitution table entry 212. The substitution table entry 212 includes three variant entries 220, 222, and 224. The variant entry 220 contains the letter "G" and represents the information that an OCR program 34 (FIG. 1) may interpret the letter "G" to be a "G". In this situation, the interpretation is the correct interpretation. The variant entry 220 depicted in FIG. 6 includes a probability value 226 (0.95) indicating that the OCR program 34 has a 95% probability of interpreting the letter "G" as a "G". The next variant entry 222 contains a "6" and a probability value 228 of 0.03. This indicates that there is a 3% probability that the OCR program 34 will interpret a "G" as a "6".

The substitution table entry 212 also includes a variant entry 224 designating "none" and a probability value 230 of 0.01. This entry represents the information that there is a 1% probability that the OCR program 34 will miss the character "G" or interpret it to be no character. Although the substitution table entry 212 depicted in FIG. 6 contains only three variant entries 220, 222, 224, an actual substitution table entry corresponding to the branch table 204 representing the letter "G" may contain more entries. The probability values illustrated are not actual probability values, but are used to simplify the illustration. Those skilled in the art of OCR will recognize that different environments, such as different OCR techniques and types of documents, will entail slightly different values in the table 23. Preferably, each substitution table entry contains variant entries corresponding to substitutions having a probability above a predetermined threshold value. To minimize the size of the table, each substitution table entry may be assumed to contain an entry corresponding to a substitution having a probability above a predetermined threshold value, necessarily much less than the lowest threshold value used in requests from the user interface 26 to the pre-processor 24.

Similarly, the branch table entry 206 representing the letter "I" corresponds to, and points to, the substitution table entry 214. This substitution table entry depicts four variant entries 232, 234, 236, and 238, representing possible substitutions "I", "l" (el), "1" (one), and none, respectively. Each of the variant entries 232, 234, 236, and 238 include corresponding probability values 240, 242, 244, and 246.

The branch table entry 208 represents the character combination "IN". An OCR program 34 may interpret a character combination erroneously in a manner having a statistical probability of occurrence. For example, as depicted in FIG. 6, the branch table entry 208 corresponds to, and points to, the substitution table entry 216, containing possible interpretations of the character combination "IN". As depicted in FIG. 6, the substitution table entry 216 contains two variant entries 248 and 250, representing the substitutions "M" and none. For illustrative purposes, the probability values 254 and 256 corresponding to the variant entries 248, and 250 are 0.05 and 0.003, respectively. The substitution table entry 216 may also include a variant entry representing a possible substitution of "IN", indicating that the OCR program may interpret the character combination "IN" to be the correct character combination "IN". However, finding a variant search word using this entry duplicates the same search word that can be found by following the branch table entries corresponding to "I" and "N". Therefore, the entry for "IN" in the substitution table entry 216 is preferably eliminated, unless statistical differences from the probabilities predicted by the values for "I" and "N" require that it be left in place. If it remains, the branch node entry (described below) for "IN" would supersede the branch node entries for "I" and "N" in processing a search request.

The branch table entry 210 in FIG. 6 represents the character "S" and points to a substitution table entry 218. The substitution table entry 218 has entries corresponding to the OCR substitutions "S", "5", and none.

The substitution table entries may be optimized to exclude the variant entries 224, 250, and 262, corresponding to no character. Instead, the OCR program 34 may contain code that has "knowledge" of a null substitution corresponding to each branch table entry. A fixed probability value may be used to correspond to the null substitution in such an optimization.

Figure 5:
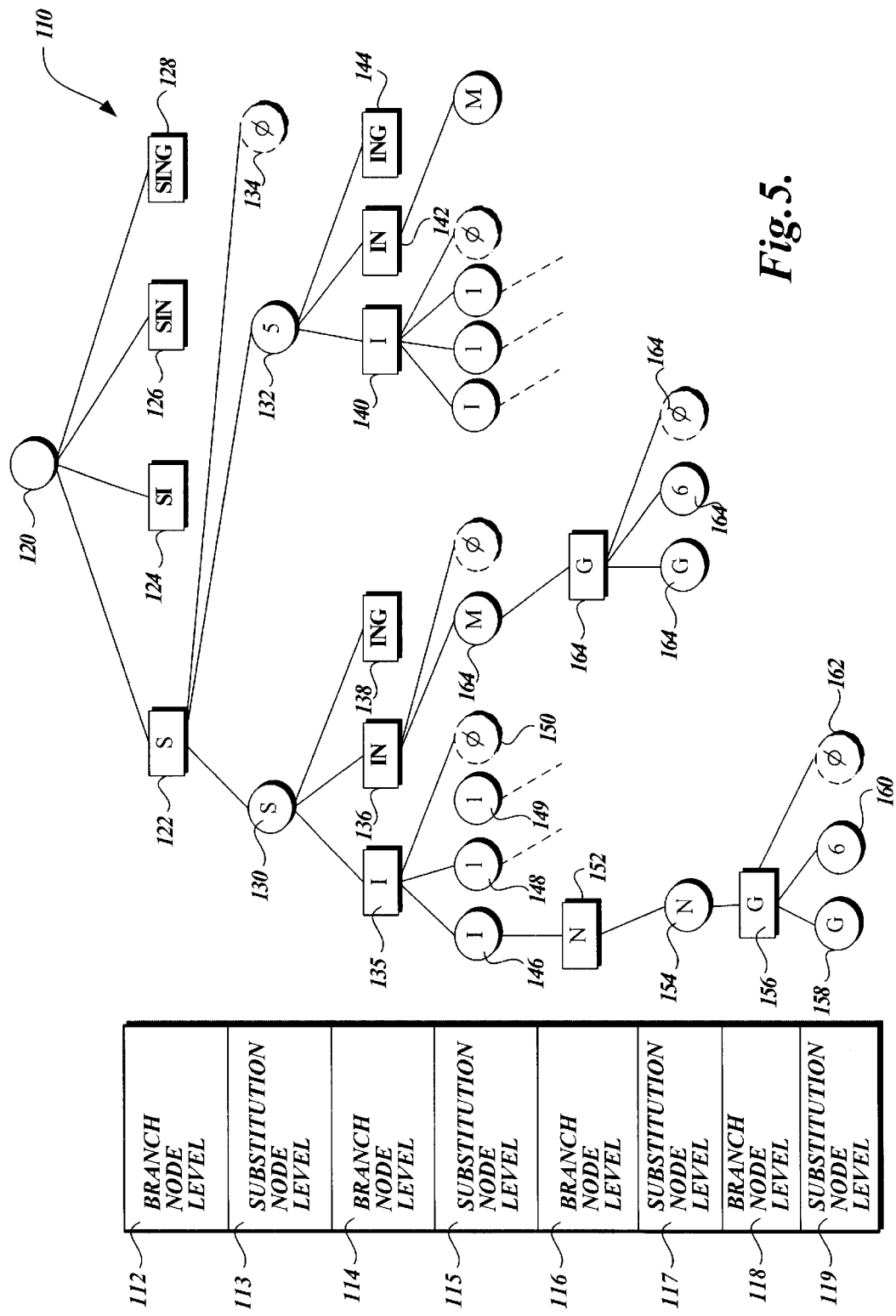
FIG. 5 is an example nodal diagram illustrating preprocessing performed in accordance with the present invention.

FIG. 5 illustrates an exemplary decision tree 110 that is created by the pre-processor 24 during the process 70 of determining variant substitution words associated with a requested search word. The decision tree 110 represents the paths that the OCR program 34 may follow during the interpretation and translation of an image of a word, to create the equivalent text. Each branch node represents a possible delineation of the next character in the input image. Because an OCR program may perceive two or more characters to be a single character, a branch node may represent one or more characters. Each substitution node represents a possible interpretation of the input character or characters represented by the substitution node's parent branch node. To illustrate the process 70, a requested search word of "SING" is assumed. The pre-processor 24 performs the process 70 of creating a decision tree 110 in order to determine the possible variants of the search word that have a probability of occurrence higher than a designated predetermined threshold probability.

The decision tree 110 has a root node 120 that serves as the root of the tree. The root node is a special case of a substitution node and has a probability of 1.0. Below the root node 120, there are alternating node levels, comprising a level of branch nodes followed by a level of substitution nodes, followed by another level of branch nodes, and another level of substitution nodes. The decision tree 110 contains as many node levels as necessary to complete the process 70 of determining variant substitution words. The root node 120 is considered to be at level zero of the decision tree 110.

The branch nodes, which exist at each branch node level, represent characters or character combinations that are input into the OCR program 34 (FIG. 1) as images. Each branch node corresponds to a branch table entry 204, 206, 208, or 210 in the branch table 200 (FIG. 6). The substitution nodes, which exist at each substitution node level, represent characters, or character combinations, that are produced by the OCR program 34 as a result of interpreting the corresponding branch node. Each substitution node corresponds to a variant entry in the substitution table 202. Each child node of a branch node corresponds to a variant entry in the substitution table entry pointed to by the branch table entry that corresponds to the branch node.

For example, at the first branch node level 112, the root node 120 has four "child" branch nodes: an "S" branch node 122, an "SI" branch node 124, an "SIN" branch node 126, and an "SING" branch node 128, representing the input characters "S", "SI", "SIN", and "SING", respectively. This indicates that the OCR program 34 may recognize any one of these character combinations as being the first character of the word "SING".

As depicted in FIG. 5, the branch node 122 has three child nodes: an "S" substitution node 130, a "5" (five) substitution node 132, and a null substitution node 134. These substitution nodes represent the information that the OCR program 34 may interpret the "S" in "SING" to be an "S", a "5", or no character, respectively. As discussed in further detail below, the "S" substitution node 130, the "5" (five) substitution node 132, and the null substitution node 134, are taken from the substitution table entry 218 (FIG. 6) corresponding to the branch table entry 210 in the statistical table 23.

Each of the substitution nodes 130, 132, 134 at the first substitution node level 113 has zero or more child branch nodes. Each of the branch nodes at the second branch node level 114 represents the next character or combination of characters that is perceived by the OCR program 34 after processing the previous character or character combinations, wherein the previous character or character combination is represented as the grandparent node of the new branch node. For example, as depicted in FIG. 5, after processing the character "S" represented by the "S" branch node 122, and interpreting the "S" to be the character "S", as represented by the "S" substitution node 130, the next character or character combination to be processed is either "I", "IN", or "ING", as represented by the "I" branch node 135, the "IN" branch node 136, and the "ING" branch node 138, respectively.

Similarly, after processing the "S" represented by the "S" branch node 122, and interpreting the "S" to be a "5", as represented by the "5" (five) substitution node 132, the next character or character combination processed by the OCR program 34 is "I", "IN", or "ING", as represented by the "I" branch node 140, the "IN" branch node 142, and the "ING" branch node 144, respectively. Note that the branch nodes 140, 142, and 144 are similar to the branch nodes 135, 136, and 138, respectively, since both sets of branch nodes represent the next character or character combinations processed by the OCR program 34 after processing the character combination represented by the grandparent branch node 122.

The substitution nodes at the second substitution node level 115 represent possible substitutions for their parent branch node at the second branch node level 114. Each of the substitution nodes is derived by looking up its parent branch node at the branch node level 114 in the branch table 200 of the statistical table 23, as illustrated in FIG. 6. For example, the "I" substitution node 146, the "l" (el) substitution node 148, the "1" (one) substitution node 149, and the null substitution node 150, representing the possible substitutions "I", "l" (el), "1" (one), and none, respectively, are child nodes of the "I" branch node 134. These substitution nodes correspond to the substitution table entry 214, which is depicted in FIG. 6 as corresponding to the branch table entry 206.

Each substitution node has a corresponding probability value that represents the probability of performing the corresponding substitution, and all of the substitutions represented by the substitution node's ancestor substitution nodes in the decision tree, during the OCR recognition process. The probability value for any substitution node incorporates the probabilities of its ancestor substitution nodes.

The cumulative probability corresponding to a substitution node is calculated by multiplying the probability value in the corresponding variant entry in the substitution table by the cumulative probability of the substitution node's grandparent substitution node. For example, the "I" substitution node 146 corresponds to the variant entry 232 (FIG. 6), which has a probability value 240 of 0.92. The value of 0.92 is then multiplied by the cumulative probability for the grandparent "S" substitution node 130, which is 0.98. The cumulative probability for the "I" substitution node 146 is therefore 0.92×0.98, or 0.9016. Similarly, the cumulative probability corresponding to the "l" (el) substitution node 148 is 0.02×0.98, or 0.0196.

As discussed above, the decision tree 110 depicted in FIG. 5 is exemplary, for illustrative purposes. In the actual practice of the invention, some of the nodes depicted in FIG. 5 may not be created, or there may be additional nodes created. In the preferable embodiment of the invention, nodes are only created in the substitution tree 110 when the path that leads to them from the root node 120 represents a cumulative substitution having a probability above a designated threshold probability.

Returning to FIG. 4, the process 70 of determining variant substitution words associated with a requested search is now discussed in conjunction with the exemplary decision tree 110 illustrated in FIG. 5 and the corresponding exemplary statistical table 23 illustrated in FIG. 6. The process 70 of determining variant substitution words includes creation of a decision tree, such as the decision tree 110 on FIG. 5. During the process 70, the pre-processor 24 maintains data that refers to a "current node."

At block 71, the pre-processor 24 creates a root node 120 and sets the root node to be the current node. At step 72, the pre-processor creates the child branch nodes of the current substitution node. As discussed above, each child branch node represents a possible recognition of the next character by the OCR program 34. When the root node 120 is the current node, no characters have been processed yet. Therefore, the child branch nodes created are branch nodes 122, 124, 126, and 128, representing input character recognitions of "S", "SI", "SIN", and "SING", respectively.

At step 74, a determination is made of whether there is a child branch node of the current node that has not been fully processed. The first time this step is reached after creating new branch nodes, none of the child branch nodes have been processed. Therefore, the answer is "yes," and processing proceeds to step 76. At step 76, the next unprocessed child branch node is set to be the current node. In the exemplary decision tree of FIG. 5, the first time step 76 is performed, the branch node 122 is set to be the current node. At step 80, a determination is made of whether there exist any substitutions that have not yet been examined for the current branch node. This determination includes examining the entry in the substitution table 202 corresponding to the current branch node. As depicted in FIG. 6, the substitution table entry 218 corresponds to the branch table entry 210 having the character "S", which corresponds to the "S" branch node 122. In substitution table entry 218, each of the variant entries 258, 260, 262 is a potential OCR substitution. The first time the step 80 is performed, none of the substitutions have been examined yet. At step 82, a substitution is retrieved for the current node. For example, the first time the step 82 is performed, the substitution "S" is retrieved from the substitution entry table 218.

At a step 84, the cumulative probability for the retrieved OCR substitution is calculated. This calculation is made by multiplying the probability value corresponding to the substitution by the cumulative probability for the parent substitution node of the current branch node 122. At this point in the process, the parent node is the root node 120, which has a cumulative probability of 1.0. Therefore, the cumulative probability for the OCR substitution of "S" is 0.98× 1.0=0.98.

At a step 86, a determination is made of whether the calculated cumulative probability is above a predetermined threshold. If the cumulative probability is above a predetermined threshold, then at a step 88, a new substitution node is created corresponding to the retrieved substitution. For example, the "S" substitution node 130 is created. The cumulative probability calculated at step 86 is stored in the "S" substitution node 130. The newly created node is then set to be the current node. Flow control then proceeds back to the step 72, where new child branch nodes of the current node are created. In the exemplary decision tree 110 of FIG. 5, the branch nodes 135, 136, and 138, representing the possible next character recognitions of "I", "IN", and "ING", respectively, are created.

The series of steps discussed above are performed repeatedly to create new branch nodes and substitution nodes and to descend the decision tree 110. As depicted in FIG. 5, the "N" branch node 152, the child "N" substitution node 154, the "G" branch node 156, and the "G" substitution node 158 are created.

After creating the "G" substitution node 158 at the step 88, and making it the current node, at the step 72, there are no child branch nodes to be created. This is because all characters of the input word, "SING", have been processed. Therefore, at the step 74, a determination is made that there are no child branch nodes of the current node that have not been processed. Flow control then proceeds to a step 94, where a determination is made of whether the current node is the root node. In the current example, the current node is not the root node, and flow control proceeds to a step 96, where determination is made of whether there are any child nodes of the current substitution node. If there are no child nodes, then a valid search word has been found. The search word is represented by the series of substitution nodes in the path from the root node to the current node. In the current example, the "S" substitution node 130, the "I" substitution node 146, the "N" substitution node 154, and the "G" substitution node 158 combine to represent the search word "SING", which is an accurate interpretation of the input image in the present example.

At a step 100, the parent branch node of the current substitution node is set to be the current node. In the present example, the "G" branch node 156 is set to be the current node. Flow control then proceeds to the step 80 to examine additional substitutions for the current node. The process then continues, as discussed above, to create additional substitution nodes, such as the "6" (six) substitution node 160 depicted in the example of FIG. 5. At the step 98, a valid search word ending with the "6" (six) substitution node 160 is found. Therefore, a second valid search word is represented by the substitution nodes 130, 146, 154, and 160, which spells "SIN6".

At the step 86, if the calculated cumulative probability is not above a predetermined threshold, flow proceeds to a step 90, where the parent substitution node of the current branch node is set to be the current node. In the exemplary decision tree of FIG. 5, this occurs when the "G" branch node 156 is the current node, and the cumulative probability for the OCR substitution null is examined. In FIG. 5, a phantom null substitution node 162 representing the null character is depicted to illustrate that the substitution of null is examined, but a substitution node is not created. In the present example, the parent "N" substitution node 154 is set to be the current node and flow control proceeds back to step 74 to determine if there are additional child branch nodes of the current node that have not been fully processed. As discussed above, if there are no unprocessed child branch nodes, as in the present example, flow proceeds to the step 94 and then to the step 96. In the present example, at the step 96, there are child branch nodes of the current node ("N" substitution node 154), so a search word is not found, and flow proceeds to the step 100, where the parent branch node is set to be current node. In this manner, the process 70 backs up the decision tree 110. The process 70 eventually reaches the step 80, when the "I" branch node 135 is the current node. As depicted in FIG. 5, the OCR substitution "l" (el) is examined and a corresponding "l" (el) substitution node 148 is created. To simplify the decision tree 110 depicted in FIG. 5, the descendant nodes of the "l" (el) substitution node 148 are not illustrated. Similarly, the "1" (one) substitution node 149 is created, and the process follows its descendant nodes (not shown). As depicted in FIG. 5, a phantom null substitution node 150 illustrates that the substitution of null is examined, but a substitution node is not created.

As will be readily understood by those skilled in the art of computer programming, and others, continuing the process 70 of determining variant substitution words results in the decision tree 110 illustrated in FIG. 5. As depicted, the "IN" branch node 136 has a child "M" substitution node 164 and a grandchild "G" branch node 166. The "G" branch node 166 has a "G" child substitution node 168 and a "6" (six) child substitution node 170. A phantom null substitution node 174 and a phantom null substitution node 176 are shown to illustrate that the process of the invention considers, but does not create these nodes, because their respective probabilities fall below the predetermined threshold.

Eventually, the root node 120 becomes the current node, and the process proceeds at the step 74 where there are no additional child branch nodes of the root node that have not been fully processed. Flow control then proceeds to step 94 where a determination is made that the current node is the root node. At this point, the process 70 is complete. All valid variant search words have been created. As depicted in FIG. 5, the process determines the variant search words to include "SING", "SIN6", "SMG", "SM6." Additional variant search words are not illustrated in FIG. 5.

As will be further understood by those skilled in the art of computer programming, and others, various changes can be made to the process 70 described above without departing from the spirit and scope of the invention. For example, the process may determine that some branch nodes, such as the branch nodes 124, 126, and 128, do not need to be created, because they represent probabilities that are below the designated threshold. Additionally, the ordering of the steps in the process 70 can be altered without departing from the invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer based method for associating variant words with an alphanumeric search request utilizing a database of optical character recognition documents, the method comprising:

obtaining an alphanumeric search request;

generating at least one variant word associated with the alphanumeric search request according to predefined optical character recognition substitution data, the optical character recognition substitution data including a set of optical character recognition substitutions and a probability of occurrence corresponding to each optical character recognition substitution, wherein the variant word is different from the alphanumeric search request; and identifying any electronic documents in the database having the at least one generated variant word.

2. The method of claim 1, wherein generating at least one variant word comprises:

determining a candidate variant word segment, each candidate variant word segment comprising at least a portion of a word;

determining whether the candidate variant word segment has a probability of occurrence above a predetermined threshold of probability; and if the candidate variant word segment does not have a probability of occurrence above the predetermined threshold of probability, excluding the candidate variant word segment from said at least one variant word.

3. The method of claim 2, wherein determining whether the candidate variant word segment has a probability of occurrence above a predetermined threshold of probability comprises:

determining a plurality of optical character recognition substitutions corresponding to the candidate variant word segment according to the predefined optical character recognition substitution data;

combining the probability of occurrence corresponding to each optical character recognition substitutions corresponding to the candidate variant word segment to determine a probability of occurrence corresponding to the candidate variant word segment; and comparing the probability of occurrence corresponding to the candidate variant word segment with the predetermined threshold of probability.

4. The method of claim 1, further comprising:

determining a plurality of optical character recognition substitutions corresponding to the alphanumeric search request according to the predefined optical character recognition substitution data; and combining the plurality of optical character recognition substitutions to create a candidate variant word segment.

5. The method of claim 1, further comprising:

creating a tree data structure having a plurality of substitution nodes, each substitution node corresponding to an element of an optical character recognition substitution corresponding to the alphanumeric search request, the tree data structure having a root node and at least one leaf node, each leaf node linked to the root node by a path corresponding to the leaf node; and combining the optical character recognition substitutions corresponding to each substitution node on the path corresponding to one of said leaf nodes to create the variant word.

6. The method of claim 5, further comprising:

determining, for each substitution node, a corresponding probability of occurrence according to the predefined optical character recognition substitution data; and determining, for each substitution node, whether the corresponding probability of occurrence is above a predetermined threshold; and in the event that the probability of occurrence corresponding to a substitution node is not above the predetermined threshold, excluding the variant word corresponding to the substitution node from said at least one variant word.

7. The method of claim 5, further comprising:

creating a branch node in the tree data structure, the branch node corresponding to a delineation of a character during optical character recognition of the alphanumeric search request;

creating at least one substitution node that is a child node of the branch node, the child node corresponding to an optical character recognition substitution for the character corresponding to the branch node.

8. The method of claim 7, wherein the optical character recognition substitution corresponding to the substitution node comprises two characters.

9. The method of claim 7, wherein the optical character recognition substitution corresponding to the substitution node represents zero characters.

10. The method of claim 1, wherein determining at least one variant word comprises determining a plurality of variant words, and searching the database occurs after determining the plurality of variant words.

11. A program storage device readable by a machine, tangibly embodying a program of instructions executable by the machine to perform method steps for searching a document database, the document database comprising optical character recognition documents, the method steps comprising:

obtaining a search request comprising a target alphanumeric word;

obtaining a plurality of optical character recognition substitutions corresponding to the target alphanumeric word;

generating at least one variant word corresponding to the target alphanumeric word, wherein the at least one variant word is different from the target alphanumeric word and is based upon the plurality of optical character recognition substitutions corresponding to the target alphanumeric word; and identifying the documents in the document database having the at least one generated variant word.

12. The program storage device of claim 11, wherein the method steps further comprise:

determining a possible optical character recognition substitution corresponding to the target alphanumeric word;

determining a probability of occurrence corresponding to the possible optical character recognition substitution;

determining whether the probability of occurrence corresponding to the possible optical character recognition substitution is above a threshold of probability;

selectively including the possible optical character recognition substitution in the plurality of optical character recognition substitutions, based upon the probability of occurrence relative to the threshold of probability.

13. The program storage device of claim 11, wherein the method steps further comprise:

specifying a plurality of substitution nodes, each substitution node corresponding to an optical character recognition substitution, the plurality of substitution nodes forming a hierarchical tree structure; and forming a variant word by including the substitutions corresponding to a set of substitution nodes forming a path between a root node and a leaf node in the hierarchical tree structure.

14. The program storage device of claim 11, wherein the method steps further comprise specifying a plurality of branch nodes within a hierarchical tree structure, each branch node representing a delineation of a character during optical character recognition of the target alphanumeric word.

15. A computer based method for searching a database of electronic documents created by the use of optical character recognition, the method comprising:

receiving an alphanumeric search request;

determining at least one variant word associated with the alphanumeric search request according to predefined optical character recognition substitution data, the optical character recognition substitution data including a set of optical character recognition substitutions and a probability of occurrence corresponding to each optical character recognition substitution, wherein the variant word is different from the alphanumeric search request;

creating a tree data structure having a plurality of substitution nodes, each substitution node corresponding to an element of an optical character recognition substitution corresponding to the alphanumeric search request, the tree data structure having a root node and at least one leaf node, each leaf node linked to the root node by a path corresponding to the leaf node; and combining the optical character recognition substitutions corresponding to each substitution node on the path corresponding to one of said leaf nodes to create the variant word; and searching the database of electronic documents according to said at least one determined variant word.

16. The method of claim 15, further comprising:

determining, for each substitution node, a corresponding probability of occurrence according to the predefined optical character recognition substitution data; and determining, for each substitution node, whether the corresponding probability of occurrence is above a predetermined threshold; and in the event that the probability of occurrence corresponding to a substitution node is not above the predetermined threshold, excluding the variant word corresponding to the substitution node from said at least one variant word.

17. The method of claim 15, further comprising:

creating a branch node in the tree data structure, the branch node corresponding to a delineation of a character during optical character recognition of the alphanumeric search request;

creating at least one substitution node that is a child node of the branch node, the child node corresponding to an optical character recognition substitution for the character corresponding to the branch node.

18. The method of claim 17, wherein the optical character recognition substitution corresponding to the substitution node comprises two characters.

19. The method of claim 17, wherein the optical character recognition substitution corresponding to the substitution node represents zero characters.

20. The method as recited in claim 1 further comprising discarding any variant words not identified in the database.

21. The method as recited in claim 11 further comprising discarding any variant words not identified in the document database.

* * * * *

UNITED STATES PATENT AND TRADEMARK OFFICE
CERTIFICATE OF CORRECTION

PATENT NO.    : 6,480,838 B1                              Page 1 of 1
DATED         : November 12, 2002
INVENTOR(S)   : W. Peterman It is certified that error appears in the above-identified patent and that said Letters Patent is hereby corrected as shown below:

Column 11,
Line 33, "character recognition substitutions" should read
-- character recognition substitution's --
Line 64, "data; and" should read -- data; --

Column 12,
Line 11, "request;" should read -- request; and --
Line 56, "probability;" should read -- probability; and --

Column 13,
Line 29, "leaf node; and" should read -- leaf node; --

Column 14,
Line 4, "data; and" should read -- data; --
Line 19, "request;" should read -- request; and --
Line 30, "claim 1" should read -- claim 1, --
Line 32, "claim 11" should read -- claim 11, --

Signed and Sealed this

Twenty-fourth Day of June, 2003

JAMES E. ROGAN
*Director of the United States Patent and Trademark Office*